United States Patent Office 3,468,107
Patented Sept. 23, 1969

3,468,107
HARVESTING MACHINES
Cornelis van der Lely, 7 Bruschenrain,
Zug, Switzerland
Filed Nov. 23, 1965, Ser. No. 517,203
Claims priority, application Netherlands, Dec. 5, 1964,
6414183
Int. Cl. A01d 43/06
U.S. Cl. 56—23                          28 Claims

ABSTRACT OF THE DISCLOSURE

A harvester having a mowing table with a central and two side portions, each having a forward cutter bar and an auger to move cut crop, the two side portions being foldable to a transport portion above the central portion by a pair of pivots, one spaced higher than the other, connected relative to the central portion which are linked through bars to a pair of further pivots on each of the side portions; the higher of such bars slanting downward from the central portion at 45° more or less and lower bar being about vertical and twice as long as the higher bar whereby a rotation of about 180° of the bars by means of a hydraulic ram causes the side portion to rotate outward and upward over the central portion to a transport position of about 90° displaced relative to their operative position.

---

This invention relates to harvesting machines, such as combine harvesters, of the kind comprising a mowing mechanism, or a mowing and a pick-up mechanism.

In acordance with the invention there is provided a harvesting machine of the kind set forth, wherein said mechanism comprises at least two portions, each of which has its own cutting mechanism, a first of said portions being mounted horizontally on the frame of the machine and a second portion being pivotable relative to said first portion, the arrangement being such that, in the operative positions of the portions, they are located side by side in such a way that crop can be mown, or mown and picked-up, throughout the width of the mechanism.

Brief description of the drawings

For a better understanding of the invention and the method by which the same is to be performed, reference will now be made, by way of example, to the accompanying drawings in which.

Description of the preferred embodiments

Figure 1:
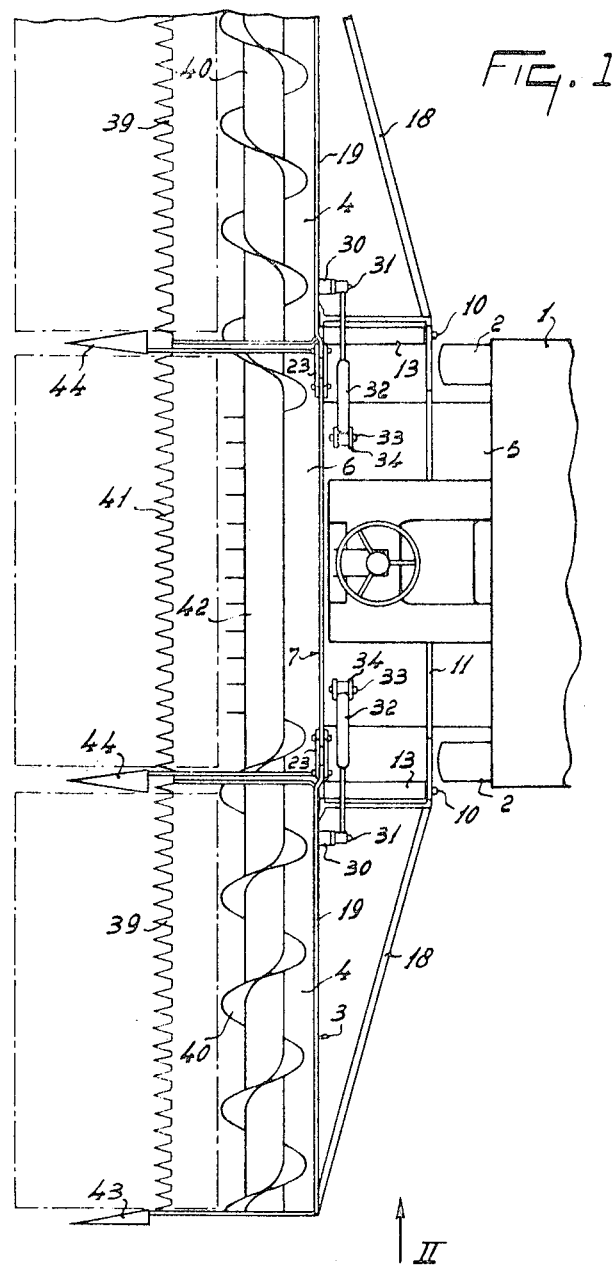
FIG. 1 is a diagrammatic plan view of a forward part of a harvesting machine in the form of a combine harvester in accordance with the invention.

Referring now to the drawings, the harvesting machine is a combine harvester whose mowing and pick-up mechanisms are located on the front end of the frame of the combine harvester which is supported, at the front, by ground wheels 2. The mowing mechanism comprises a mowing table or platform 3 which has three adjacent portions which lie side by side during operation. The mowing table 3 comprises a central portion 6, and two identical portions 4 which are pivotally connected to an elevator housing 5 in a manner which will be more fuly described later. The elevator housing 5 extends upwardly and rearwardly from the mowing table 3 and comprises a central path for elevating crop which is fed from the mowing table 3. The mowing table 3, as noted before, includes also comprises the central portion 6, and the housing 5 is connected to the rear wall of the portion 6, which rear wall is formed with an opening through which crop is passed from the mowing table 3 to the elevator housing 5.

The housing 5 accommodates an endless elevator 6A (FIG. 3), the upper drive shaft of which (not shown) also serves as a pivotal shaft about which the mowing table 3, together with the housing 5, are upwardly and downwardly turnable.

Figure 2:
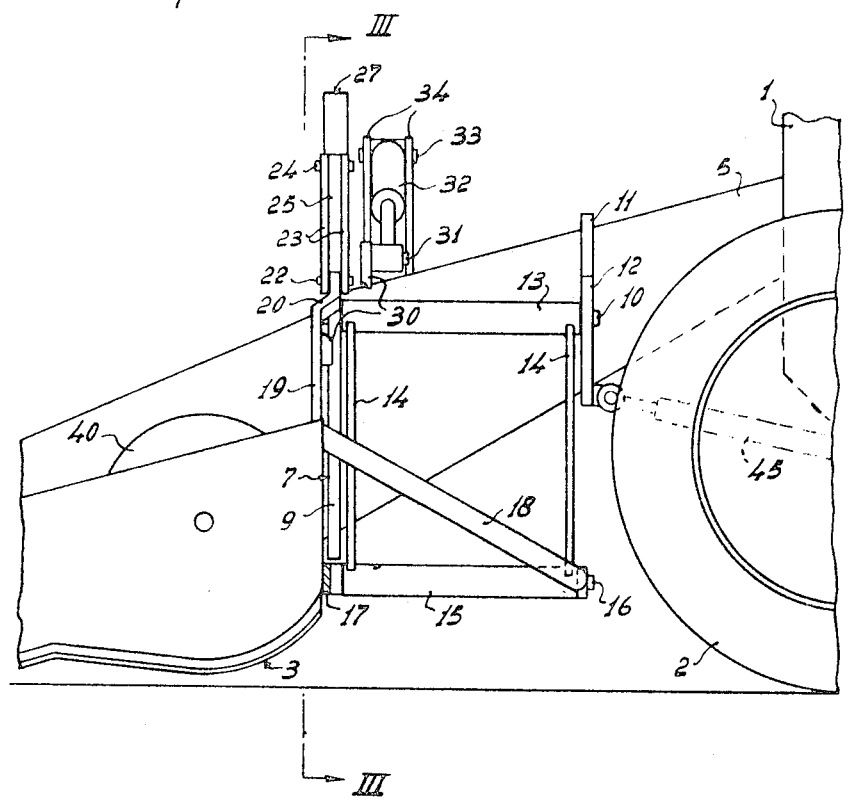
FIG. 2 is a side view, to an enlarged scale, taken in the direction of the arrow II in FIG. 1.
Figure 3:
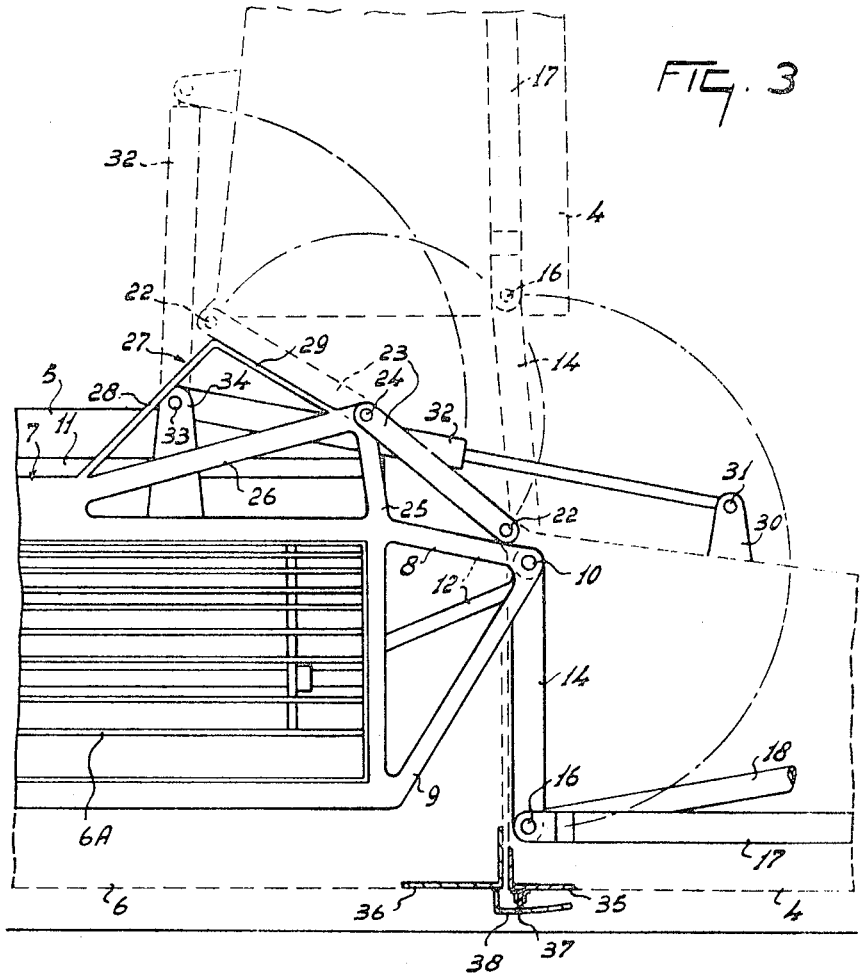
FIG. 3 is a sectional view, taken on the line III—III in FIG. 2.

From FIGS. 2 and 3 it will be seen that the housing 5 is provided with a generally rectangular frame structure 7 mounted on the side of the housing 5 which adjoins the rear wall of the mowing table portion 6. Since the mowing table portions 4 are identical, for convenience, FIGURE 3 only shows the connection of one of the portions 4 to the central portion 6 and will be described with reference to the portion 4 shown.

A support 8 is connected to the end of the structure 7, said support 8 extending gently downwardly from its connection with the frame 7. The support 8 is connected to a support 9 which extends downwardly therefrom to meet the lower side of the end of the structure 7 and a shaft 10 is journalled at the junction between the supports 8 and 9, the shaft 10 extending parallel to the intended direction of operative travel of the combine harvester. The shaft 10 is also journalled in a frame structure 11 (FIGS. 1 and 2) which is spaced from the frame structure 7 and is mounted around the elevator housing 5. To this end the structure 11 is provided with an angled support 12, one of whose limbs extends parallel to the support 8 and the shaft 10 is journalled in the end of the support 12 remote from the structure 11. The shaft 10 is surrounded by a sleeve 13 which carries arms 14 near its opposite ends. The arms 14 extend parallel to each other and have their ends interconnected by a sleeve 15 which extends parallel to the sleeve 13. The sleeve 15 is turnably mounted on a shaft 16 which is connected at one end to the end of a frame beam 17 which is mounted near the lower end of the rear wall of the portion 4. The other end of the shaft 16 is conected to the end of a beam 18 which extends therefrom to the outer upper end of the portion 4.

The upper side of the read wall of the portion 4 is provided with a beam 19 (FIGS. 1 and 2) which carries an angular lug 20 (FIG. 2) on its end which faces the central portion 6. The lug 20 has a stub shaft 22 rotatably mounted therein and two arms 23 are pivotally mounted on said shaft 22, one on each side of said lug 20. The other ends of the arms 23 are pivotally connected to a support 25, which is mounted on the upper side of the frame structure 7, by means of a pivot shaft 24. The arms 23 are located one on each side of the support 25 (FIG. 2). The support 25 is also connected with the upper side of the frame structure 7 through a strut 26, which strut 26 is provided on its upper side with two strips 28 and 29 which afford a stop 27. The strips 28 and 29 extend from opposite ends of the strut 26 and meet each other at right angles above the strut.

A lug support 30 is mounted on the upper side of the portion 4 and a stub shaft 31 is carried by said support 30. A hydraulic ram 32 is pivotally connected to the support 30 on said shaft 31 and extends therefrom to a support 34 that is secured to the upper side of the housing 5, the ram 32 being pivotally connected to the support 34 on a stub shaft 33 carried by the support 34.

The bases of the portions 4 comprise plates 35 and the base of the portion 6 comprises a plate 36 (FIG. 3). A seal is provided between the adjacent portions near the junctions between the bases thereof. The seals comprise strips 37 made of, for example, rubber, which strips cooperate with angular plate extensions 38 which are secured to the base plate 36 of the portion 6 and extend throughout the length of the portion 6 in the intended direction of operative travel. The extensions 38 also extend outwardly and slightly upwardly from the portion 6. Hence an uninterrupted passage for crop is obtained which extends throughout the length of the mowing platform when measured perpendicular to the intended direction of operative travel.

Figure 4:
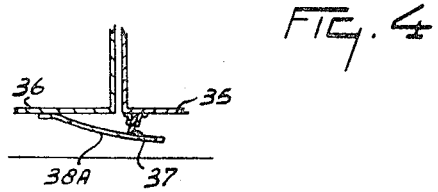
FIG. 4 is a fragmentary sectional view showing an alternative embodiment of sealing mechanism which can be arranged between adjacent portions of the mowing mechanism.

FIGURE 4 shows a second embodiment of seal in which a plate extension 38A is secured to the base plate 36 which bends gently downwardly therefrom. Also the strips 37 are inclined at an angle to the vertical.

Referring to FIG. 1, it will be evident that each pivotable mowing table portion 4 comprises a cutter bar 39 and an auger 40 arranged behind the corresponding cutter bar 39, both the cutter bar 39 and auger 40 extending perpendicular to the intended direction of operative travel. The central portion 6 is provided with a cutter bar 41 and a tined auger 42 which is located behind the cutter bar 41, both the cutter bar 41 and the auger 42 extending perpendicular to the intended direction of operative travel. The portions 4 of the mowing table are provided with crop dividers 43 on their outer sides and the central portion 6 is provided, on each side, with crop dividers 44. The mowing table portions are each provided with a corresponding reel, but these are not shown for the sake of clarity. Also the driving mechanisms for the various working parts of the mowing table are not shown for the sake of clarity, but they may comprise a usual arrangement including shafts, sprockets and chains.

Hydraulic rams 45 (FIG. 2) are arranged, in known manner, one on each side of the housing 5 and extend between the axle of the wheels 2 and the frame structure 11. The hydraulic rams 45 serve to raise and lower the elevator housing 5 and mowing table 3 about their pivot afforded by the upper rotary shaft of the elevator conveyor 6A.

The operation of the combine harvester will now be described. The two outer portions 4 of the mowing table are each capable of pivoting freely about four pivots afforded by the shafts 10, 16, 22, and 24 which are spaced from each other. Hence the portions 4 can match unevennesses in the ground. Two of the shafts are arranged on each portion 4 and two are mounted on the frame of the machine, that is on the housing 5. The shaft 24 is located at a higher level than the shaft 22 and is located at some distance from the side of the portion 6. The shafts 10 and 16 are interconnected by the arms 14 and are located, in the working or transport position substantially vertically one above the other. The length of the arms 14 is approximately twice that of the arms 23. The crop cut or mown by the cutter bars 39 associated with the pivotable portions 4 is displaced inwardly by the augers 40. The cutter bar 41 of the portion 6 cuts crop which is fed to the elevator housing by the tined auger 42. The crop urged inwardly by the augers 40, is also fed to the housing 5 by the auger 42. The outlet opening formed in the rear wall of the central portion 6, which wall adjoins the elevator housing 5, comprises the sole delivery outlet for the mowing table.

When it is desired to change the combine harvester to a transport position, the portions 4 are pivoted upwardly by means of the hydraulic rams 32 and the assembly then takes up the position shown in broken lines in FIG. 3. The shafts 16 and 22 and the ram 32 follow the paths indicated in FIG. 3. It will be remembered that each portion 4 is pivotally connected to the shafts 16 and 22 but not to the shaft 10. Hence each portion 4 can pivot upwardly about the shaft 16 and can also pivot about the shaft 22. In the transport position the arms 14 have pivoted through approximately 180° about the shaft 10 which is mounted on the frame of the combine harvester. The arms 23 which link the upper side of the portion 4 to the housing 5 bear against the stop 27 in the transport position of the portion 4, the arms 23 constituting a guide during the pivoting movement. In the transport positions of the portion 4, they are located in such a position that their centers of gravity are located approximately mid-way between the two outer shafts 10 and 22.

The overall width of the mowing table may be, for example, 6 meters and when the two outer portions are turned upwardly into the transport position, the combine harvester then has a suitable width for transport through narrow gates or along narrow roads. Also, even when the outer portions are turned upwardly the central portion may still be employed to cut and pick-up crop lying in narrow rows or swaths. Since the central portion 6 occupies a substantially horizontal position even when the portions 4 are turned upwardly, the combine harvester has a relatively low level center of gravity for a transport position since the portion 6 is low relative to the frame of the harvester and the turned portions 4.

The arrangement of the three mowing table portions is such that, in their operative positions, crop can be mown and picked-up throughout the width of the combine harvester.

It will be evident that the pivotal shafts for the outer portions may be arranged in different manner so that the portions 4 can be swung to the rear for movement into a transport position.

What I claim is:

1. A harvesting machine which comprises a frame and at least first and second portions (6, 4) connected to said frame which are joined to each other and are arranged to be located side by side in their operative positions, the portions being pivotable relative to each other about at least two pivotable axes which are spaced from each other as viewed in the intended direction of operative travel of the machine, said first portion occupying a fixed angular position on said frame relative to the horizontal, linkage means (14, 23), said second portion being connected to said frame by means of four pivotal shafts (10, 16, 22, 24) which are spaced from each other viewed in the intended direction of operative travel and by said linkage means.

2. A harvesting machine as claimed in claim 1, wherein two of said pivotal shafts are mounted on said frame and the other two of said pivotal shafts are mounted on said second portion.

3. A harvesting machine as claimed in claim 2, wherein the two pivotal shafts mounted on said frame are located on the upper side of said first portion.

4. A harvesting machine as claimed in claim 3, wherein one of said two pivotal shafts mounted on said frame is located near the side of said first portion which faces said second portion, the other pivotal shaft of the two pivotal shafts mounted on said frame is located at a higher level than, and is spaced at a distance from, said facing side of said first portion.

5. A harvesting machine as claimed in claim 4 wherein the two pivotal shafts mounted on said second portion are arranged near said facing side of said first portion.

6. A harvesting machine as claimed in claim 4, wherein each pivotal shaft mounted on said frame is connected with a corresponding one of the shafts mounted on said second portion by means of an arm.

7. A harvesting machine as claimed in claim 6, wherein the pivotal shaft mounted on the lower side of said second portion is connected to the lowermost pivotal shaft mounted on said frame.

8. A harvesting machine as claimed in claim 7, wherein guide means is afforded by at least one arm which extends between the uppermost pivotal shaft mounted on said frame and said second portion.

9. A harvesting machine as claimed in claim 8, wherein the pivotal shafts mounted on said frame and on said second portion are arranged relatively to each other whereby upon turning of said second portion, said guide means revolves through 180° about its corresponding pivotal shaft on said frame.

10. A harvesting machine as claimed in claim 9 wherein said linkage means including arm means interconnecting the two other pivotal shafts mounted respectively on said frame and said second portion wherein the said guide means extending between the lowermost pivotal shaft on said frame and said second portion is connected to the lowermost pivotal shaft on said second portion and has a length which is approximately twice that of said arm means interconnecting the two other pivotal shafts mounted respectively on the frame and said second portion.

11. A harvesting machine as claimed in claim 10, wherein said guide means which extends between the lowermost pivotal shaft on said frame and the lowermost pivotal shaft on said second portion extends substantially vertically when said portions are arranged in operative positions.

12. A harvesting machine as claimed in claim 10 wherein support means is provided which acts as a stop whereby said arm means abuts against said support means when said second portion has turned through about 90° from its operative position.

13. A harvesting machine as claimed in claim 12, wherein said support means arranged whereby said second portion occupies such a position when it has been turned through 90° that its center of gravity is located between the longitudinal center line of said machine and one of the pivotal shafts about which it turns.

14. A harvesting machine as claimed in claim 11 wherein a hydraulic ram is arranged to connect said first portion and said second portion whereby that said second portion is pivoted relative to said first portion.

15. A harvesting machine as claimed in claim 11 wherein the pivotal connection of said second portion is arranged on the rear side of said second portion with respect to the intended direction of operative travel of the machine.

16. A combine harvester having a mowing table (7), said mowing table comprising at least two portions (4, 6) which extend substantially horizontally in their operative positions, each portion having its own mowing mechanism including cutter means (39, 41), one of said portions being pivotable relative to the other through joint means comprising two anchored pivotal means (24, 10) on one of said portions, two movable pivotal means (16, 22) each having means (14, 23) linking them to said first-mentioned pivotal means, control means (32) connecting said portions whereby said control means causes one of said portions to pivot to a position above the other of said portions.

17. A combine harvester in accordance with claim 16, wherein one of said portions includes the frame of the harvester, said anchored pivotal means being mounted on said frame and said movable pivot means being mounted on the other of said portions.

18. A combine harvester in accordance with claim 17, wherein said anchored pivotal means are located at least in part in substantially the same plane as said movable pivotal means.

19. A combine harvester in accordance with claim 18 wherein one of said anchored pivotal means is located adjacent said portion adapted to pivot above the other portion and the other of said anchored pivotal means is located above and inboard of said first-mentioned anchored pivotal means.

20. A combine harvester in accordance with claim 19 wherein each of said linking means comprises an arm.

21. A combine harvester in accordance with claim 20 wherein one of said movable pivotal means is located higher than the other, the higher of said anchor pivotal means being connected to the higher of said movable pivotal means by one of said arms and the lower of said anchor pivotal means being connected to the lower of said movable pivotal means by the other of said arms.

22. A combine harvester in accordance with claim 21 wherein said arm connecting said higher pivotal means revolves about 180° around its said anchor pivotal means when the portion adapted to be pivoted is brought from operative to transport position.

23. A combine harvester in accordance with claim 22 wherein said arm connecting said lower pivotal means is effectively about twice as long as said arm connecting said higher pivotal means.

24. A combine harvester in accordance with claim 23 wherein said lower pivotal means are substantially disposed within a vertical plane when said portions are in operative positions.

25. A combine harvester in accordance with claim 24 including support means on said frame which is adapted to receive said arm connecting said lower pivotal means when said portions are in transport position.

26. A combine harvester in accordance with claim 25 wherein when said portions are in transport position the center of gravity of the portion which has been pivoted above the other is disposed between the longitudinal axis of the harvester and the outboard of said anchored pivotal means.

27. A combine harvester in accordance with claim 16 wherein said control means comprises a hydraulic ram.

28. A combine harvester in accordance with claim 16 wherein said joint means is disposed relative to the rear side of the portion adapted to be pivoted above the other.

References Cited
UNITED STATES PATENTS

| | | | |
|---|---|---|---|
| 1,724,300 | 8/1929 | Moncreiffe | 56—21 |
| 2,224,970 | 12/1940 | Lindgren et al. | 56—20 |
| 2,262,906 | 11/1941 | Raney et al. | 56—122 |
| 2,603,052 | 7/1952 | Pelham | 56—25 |
| 3,034,274 | 5/1962 | Webb | 56—6 |

HUGH R. CHAMBLEE, Primary Examiner